No. 649,860. Patented May 15, 1900.
A. OPPERT.
APPARATUS FOR CUTTING GROOVES IN METAL PLATES.
(Application filed Feb. 10, 1900.)
(No Model.)
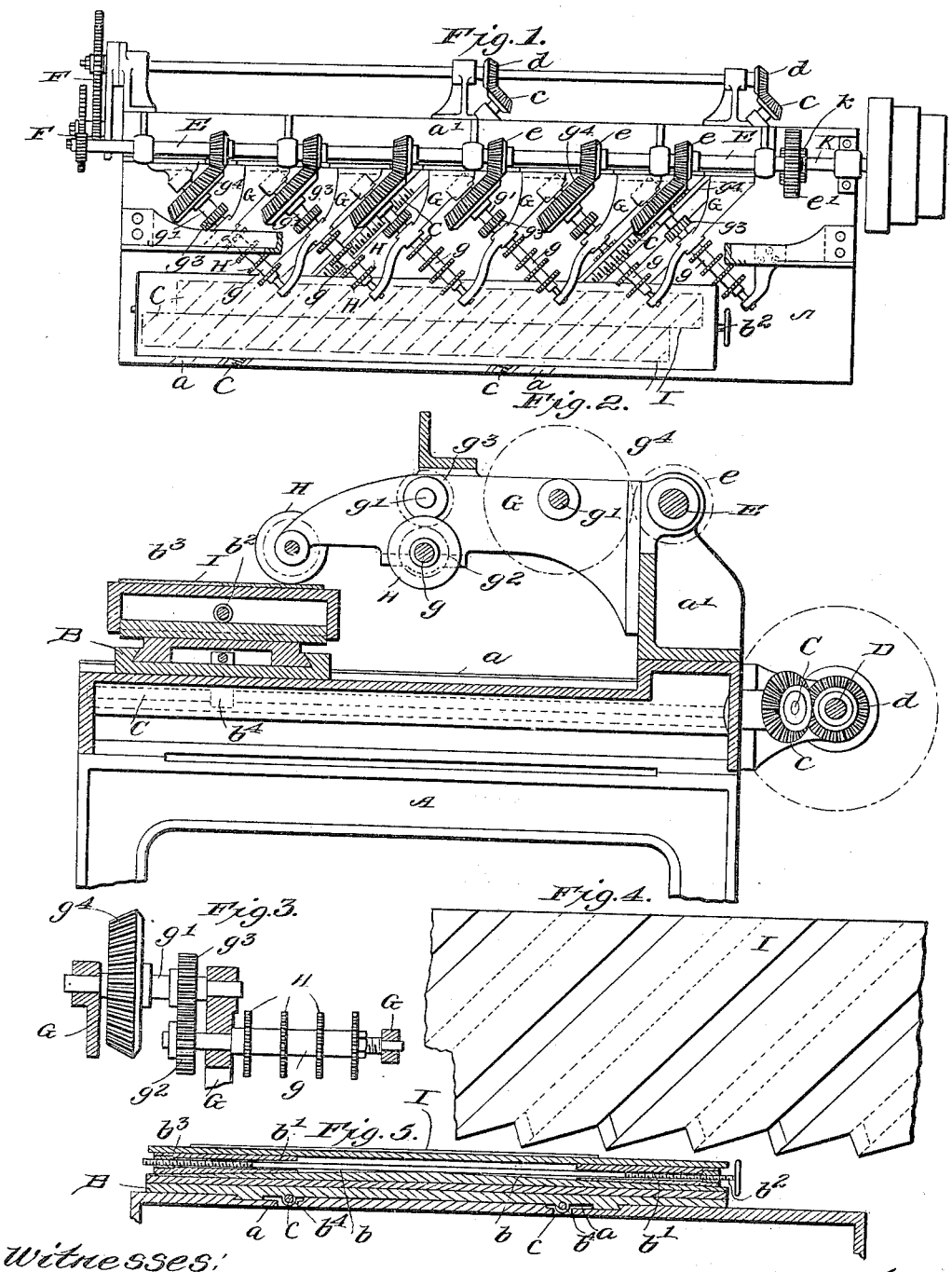
Witnesses:
C. D. Kesler,
W. H. Clarke
Inventor
Adolph Oppert.
By James L. Norris
Atty

UNITED STATES PATENT OFFICE.

ADOLPH OPPERT, OF HAMBURG, GERMANY, ASSIGNOR TO EMILE DANIEL OPPERT, OF LONDON, ENGLAND.

APPARATUS FOR CUTTING GROOVES IN METAL PLATES.

SPECIFICATION forming part of Letters Patent No. 649,860, dated May 15, 1900.

Application filed February 10, 1900. Serial No. 4,800. (No model.)

*To all whom it may concern:*

Be it known that I, ADOLPH OPPERT, civil engineer, a subject of the Emperor of Germany, residing at Hamburg, Germany, have invented a certain new and useful Apparatus for Cutting Grooves in Metal Plates, of which the following is a specification.

This invention relates to apparatus for cutting grooves in metal plates to be used for saws or for other purposes, and has for its object efficient apparatus whereby a number of grooves of the required depth may be cut on one side of such plate in a single operation and at the required angle to the longitudinal axis of said plate.

According to this invention the plate or plates to be grooved are fixed in a suitable manner to a slide rest or table, which latter is adapted to slide diagonally or otherwise across the machine and to coöperate with a set or sets of rotary or other cutters. These cutters are arranged parallel to the line in which the slide rest or table travels and are actuated through suitable gear from any convenient source of power. The slide rest or table is adapted to be adjusted with relation to the cutters in such manner as to permit grooves of any required depth to be cut in the plates. This adjustment of the slide rest is effected by supporting the top of said rest on wedge-shaped blocks, which bear upon inclined surfaces carried by the base of the rest and which are adapted to raise or lower said slide-rest accordingly as they are moved toward or away from each other. The slide rest or table slides on or between guides and is operated by screw shafts or rods, which engage with fixed nuts or tapped holes on the said rest or table and which are actuated by bevel or other gear from a rotary shaft driven through the intervention of suitable gear and a second shaft from the driving-shaft.

I will now proceed to describe my invention more fully in connection with the accompanying drawings, in which—

Figure 1 is a plan of the apparatus. Fig. 2 is a vertical section on the line $x\,x$, Fig. 1. Fig. 3 shows a group of cutters and their driving-gear. Fig. 4 shows, on a larger scale, part of a saw-blade grooved by means of the apparatus. Fig. 5 is a longitudinal sectional view of the sliding table, showing the means for adjusting the height of the same.

The apparatus shown in the drawings is adapted to cut grooves in the plate at an angle to the longitudinal axis thereof.

A is the frame of the machine.

B is the slide rest or table, which comprises a base having oppositely-inclined surfaces $b\,b$, wedge-shaped blocks $b'\,b'$, the inclined surfaces of which rest, respectively, upon the surfaces $b\,b$, a rod $b^2$, which has its opposite ends respectively screw-threaded in opposite directions and engaging correspondingly screw-threaded holes in the blocks $b'\,b'$, and a top plate $b^3$, which rests upon the blocks $b'\,b'$. Lugs such as $b^4$, each of which is provided with a screw-threaded hole, are attached to the slide-rest.

$a\,a$ are grooves or guides which run diagonally across the frame and in which the slide-rest is adapted to travel.

C C are screw-threaded rods which respectively engage with the lugs $b^4\,b^4$ and are journaled in suitable bearings carried by the machine-frame.

$c\,c$ are bevel gear-wheels carried, respectively, by the rods C C.

D is a driving-shaft journaled in bearings carried by the machine-frame.

$d\,d$ are bevel gear-wheels carried by the shaft D and gearing, respectively, with the bevel-wheels $c\,c$ on the rods C C.

E is the main driving-shaft, journaled in bearings carried by a beam or standard $a'$ on the frame A.

$e\,e$ are bevel-wheels carried by the shaft E.

The shafts D and E are geared together by a suitable train of toothed wheels F F.

G G are brackets carried by the standard $a'$.

$g\,g$ are rotary cutter-shafts journaled in bearings carried by the brackets G G. $g'\,g'$ are other rotary shafts also journaled in bearings carried by the brackets G G.

$g^2\,g^2$ are toothed wheels which are carried by the shafts $g\,g$ and which gear with toothed wheels $g^3\,g^3$, carried by the shafts $g'\,g'$.

$g^4\,g^4$ are bevel-wheels which are carried by the shafts $g'\,g'$ and which gear with the bevel-wheels $e\,e$ on the shaft E.

H H are rotary cutters arranged in groups on the shafts $g\,g$.

I I are metal plates placed in position on the top plate $b^3$ of the slide-rest.

The shaft E may be driven from any suitable source of power through a pulley-shaft K and suitable gear-wheels $k$ and $e'$. When the shaft E is driven, the shaft D is also driven through the gear-wheels F F and the cutters H H are caused to rotate through the intervention of the gear-wheels $e$, $g^4$, $g^3$, and $g^2$. The rods C C are also rotated by the shaft D through the bevel-gear $d$ $c$. When thus rotated, the rods C C cause the slide-rest to travel diagonally across the machine and draw the plates I I under and in contact with the cutters H H as the latter rotate, grooves being thereby cut in the surface of said plates I, as indicated by the dot-and-dash lines in Fig. 1.

By turning the screw $b^2$ the top $b^3$ of the slide-rest, and consequently the plates I I, can be adjusted with respect to the cutters H H, so as to obtain grooves of the required depth.

After each cutting operation the slide-rest is returned in readiness for the grooving of a fresh surface.

What I claim is—

1. In apparatus for cutting grooves in metal plates, the combination with a series of parallel shafts arranged diagonally of the bed of the machine and rotary cutters mounted on said shafts, of a slide-rest for carrying the metal plates, and means for moving said slide-rest diagonally of said bed and in a direction at right angles to said shafts.

2. In apparatus for cutting grooves in metal plates, the combination with a series of parallel cutters arranged diagonally of the bed of the machine, of a slide-rest for carrying the metal plates, lugs on said slide-rest having screw-threaded openings therein, a diagonally-arranged operating-shaft for said slide-rest fitting within the opening in said lug and engaging the screw-threads therein, a driving-shaft, and connections between said cutters and said driving-shaft, and between said slide-rest-operating shaft and said driving-shaft, whereby during the operation of said driving-shaft said cutters will be actuated and said slide-rest will be moved diagonally of the bed of the machine parallel to or in line with said cutters.

3. In apparatus for cutting grooves in metal plates, the combination with a series of stationary cutters, and means for operating the same, of a slide-rest for carrying the metal plates, projections having screw-threaded holes on said slide-rest, rotary screw-rods engaging with the holes in said projections, and connections between the operating means for said cutters and said screw-rods, whereby during the operation of the former the slide-rest will be moved with reference thereto, substantially as described, for the purpose specified.

4. In apparatus for cutting grooves in metal plates, the combination of a slide-rest for carrying the metal plates, groups of stationary rotary cutters arranged at an angle to the longitudinal axis of the slide-rest, parallel to the line of movement of said slide-rest and in planes at right angles to said slide-rest, means for rotating the cutters, and means for moving the slide-rest with reference to the cutters so as to cut a number of parallel grooves in the plates, substantially as described.

5. In apparatus for cutting grooves in metal plates; the combination of a slide-rest for supporting the metal plates which comprises a base having oppositely-inclined bearing-surfaces, wedge-shaped blocks respectively provided with oppositely screw-threaded holes and adapted to slide on said inclined surfaces, a screw-rod having its ends respectively screw-threaded in opposite directions and engaging with the holes in the said blocks, and a top plate resting upon said blocks; groups of stationary rotary cutters; a separate rotary shaft carrying each group of cutters and arranged at right angles to the line of movement of the slide-rest; means for rotating the cutter-shafts and cutters; and means for moving the slide-rest with reference to the cutters so as to cut a number of parallel grooves in the plates; substantially as described.

6. In apparatus for cutting grooves in metal plates; the combination of a slide-rest for supporting the metal plates which comprises a base having oppositely-inclined bearing-surfaces, wedge-shaped blocks respectively provided with oppositely screw-threaded holes and adapted to slide on said inclined surfaces, a screw-rod having its ends respectively screw-threaded in opposite directions and engaging with the holes in said blocks, and a top plate resting upon said blocks; projections having screw-threaded holes on said slide-rest; rotary screw-rods engaging with the holes in said projections; groups of stationary rotary cutters; a separate rotary shaft carrying each group of cutters and arranged at right angles to the line of movement of the slide-rest; and means for simultaneously rotating the cutters and the said screw-rods; substantially as described for the purpose specified.

In testimony whereof I have hereunto set my hand, in presence of two subscribing witnesses, this 29th day of January, 1900.

ADOLPH OPPERT.

Witnesses:
  E. H. L. MUMMENHOFF,
  OTTO W. HELLENRICH.